(12) United States Patent
Totsuka et al.

(10) Patent No.: US 12,331,905 B2
(45) Date of Patent: Jun. 17, 2025

(54) VEHICLE LAMP

(71) Applicant: KOITO MANUFACTURING CO., LTD., Tokyo (JP)

(72) Inventors: Takahiro Totsuka, Shizuoka (JP); Yusuke Fukuta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/834,364

(22) PCT Filed: Jan. 30, 2023

(86) PCT No.: PCT/JP2023/002926
§ 371 (c)(1),
(2) Date: Jul. 30, 2024

(87) PCT Pub. No.: WO2023/145947
PCT Pub. Date: Aug. 3, 2023

(65) Prior Publication Data
US 2025/0164096 A1    May 22, 2025

(30) Foreign Application Priority Data
Jan. 31, 2022  (JP) .................. 2022-013496

(51) Int. Cl.
| | |
|---|---|
| *F21S 45/10* | (2018.01) |
| *F21S 41/19* | (2018.01) |
| *F21S 41/20* | (2018.01) |
| *F21S 41/663* | (2018.01) |
| *F21S 45/33* | (2018.01) |

(Continued)

(52) U.S. Cl.
CPC ............. *F21S 45/10* (2018.01); *F21S 41/192* (2018.01); *F21S 41/2805* (2024.05); *F21S 41/663* (2018.01); *F21S 45/33* (2018.01); *F21S 45/50* (2018.01); *F21W 2102/13* (2018.01)

(58) Field of Classification Search
CPC ....... F21S 41/19–192; F21S 41/20–295; F21S 41/30–338; F21S 41/663; F21S 45/00–20; F21S 45/30–50; F21W 2102/10–19
See application file for complete search history.

(56) References Cited

U.S. PATENT DOCUMENTS 6,000,824 A * 12/1999 Konagaya ................ B60Q 1/32
362/549

FOREIGN PATENT DOCUMENTS

JP    2010-123292 A    6/2010

OTHER PUBLICATIONS

International Search Report (PCT/ISA/210) issued on Mar. 20, 2023 by the International Searching Authority in International Application No. PCT/JP2023/002926.

(Continued)

*Primary Examiner* — Jason M Han
(74) *Attorney, Agent, or Firm* — Sughrue Mion, PLLC

(57) ABSTRACT

A vehicle lamp including: a container-shaped lamp body whose front surface is opened; and a front cover assembled to a front opening of the lamp body and defines a lamp chamber inside. On a back wall of the lamp body, a plurality of beams having a substantially arc-shaped cross section and constituting a part of the back wall extend in a truss shape from an upper edge portion to a lower edge portion of the back wall.

5 Claims, 12 Drawing Sheets

(51) Int. Cl.
*F21S 45/50* (2018.01)
*F21W 102/13* (2018.01)

(56) References Cited

OTHER PUBLICATIONS

Written Opinion (PCT/ISA/237) issued on Mar. 20, 2023 by the International Searching Authority in International Application No. PCT/JP2023/002926.

* cited by examiner

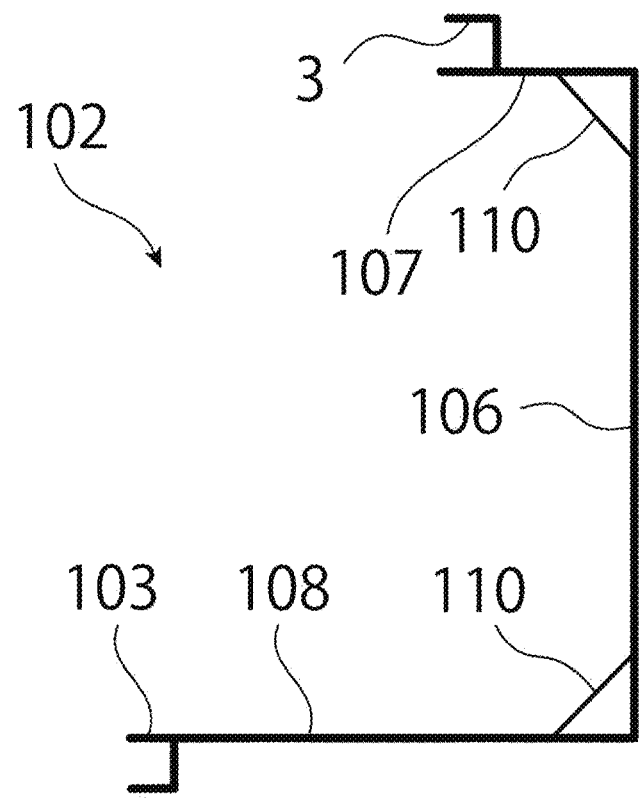
FIG. 6A
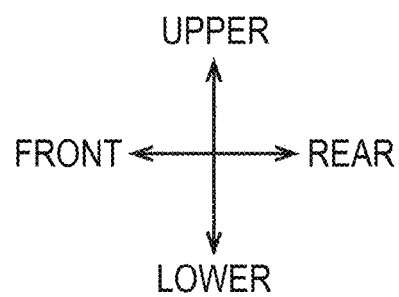

VEHICLE LAMP

CROSS-REFERENCE TO RELATED APPLICATIONS

This application is a National Phase Entry of PCT International Application No. PCT/JP2023/002926 filed on Jan. 30, 2023, which claims priority to Japanese Patent Application No. 2022-013496 filed on Jan. 31, 2022, the contents of all of which are incorporated herein by reference in their entirety.

TECHNICAL FIELD

The present invention relates to a vehicle lamp including a lamp body and a front cover.

BACKGROUND ART

In recent years, weight reduction of a lamp is required from the viewpoint of carbon neutrality. When the wall thickness of a lamp body is simply reduced in order to reduce the weight, the rigidity of the body may decrease. Due to an increase in the number of lamp units to be accommodated and an increase in sensors to improve the safety performance, the number of components mounted on the vehicle lamp is increased, the load is increased on the lamp body to which the component is attached, and thus, problems such as deformation and interference may occur. In order to solve these problems, for example, Patent Literature 1 discloses that a reinforcing rib is provided on a lamp body.

CITATION LIST

Patent Literature

Patent Literature 1: JP2010-123292A

SUMMARY OF INVENTION

Technical Problem

When the reinforcing rib is provided in order to improve the rigidity of the lamp body, the weight of the lamp body may be increased.

The present disclosure has been made in view of the circumstances, and the object of the present disclosure is to provide a vehicle lamp that can reduce the weight and improve the rigidity.

Solution to Problem

In order to solve the above problem, a configuration of the present disclosure provides a vehicle lamp including: a container-shaped lamp body whose front surface is opened; and a front cover that is assembled to a front opening of the lamp body and that defines a lamp chamber inside, in which, on a back wall of the lamp body, a plurality of beams having a substantially arc-shaped cross section and constituting a part of the back wall extend in a truss shape from an upper edge portion to a lower edge portion of the back wall.

According to this aspect, the rigidity of the back wall is improved by the truss structure using the beam. Since the beam is implemented by a curved surface having a substantially arc-shaped cross section, the stress is more dispersed than when the beam is implemented by a flat surface. Accordingly, the rigidity of the lamp body is improved, the rib reinforcement can be reduced, and the weight can be reduced.

Advantageous Effects of Invention

According to the present disclosure, it is possible to provide a vehicle lamp that can reduce the weight and improve the rigidity.

BRIEF DESCRIPTION OF DRAWINGS

FIG. 6A is a vertical end view of a lamp body 102 having a configuration in the related art for comparison.

DESCRIPTION OF EMBODIMENTS

Hereinafter, a specific embodiment of the present invention will be described with reference to the drawings. The embodiment is exemplary only without limiting the invention, and all or combinations of the features described in the embodiment are not necessarily essential to the invention. In the following description of the embodiment and the modification, the same configurations are denoted by the same reference signs, and the overlapping description thereof will be appropriately omitted.

Vehicle Lamp 1

Figure 1:
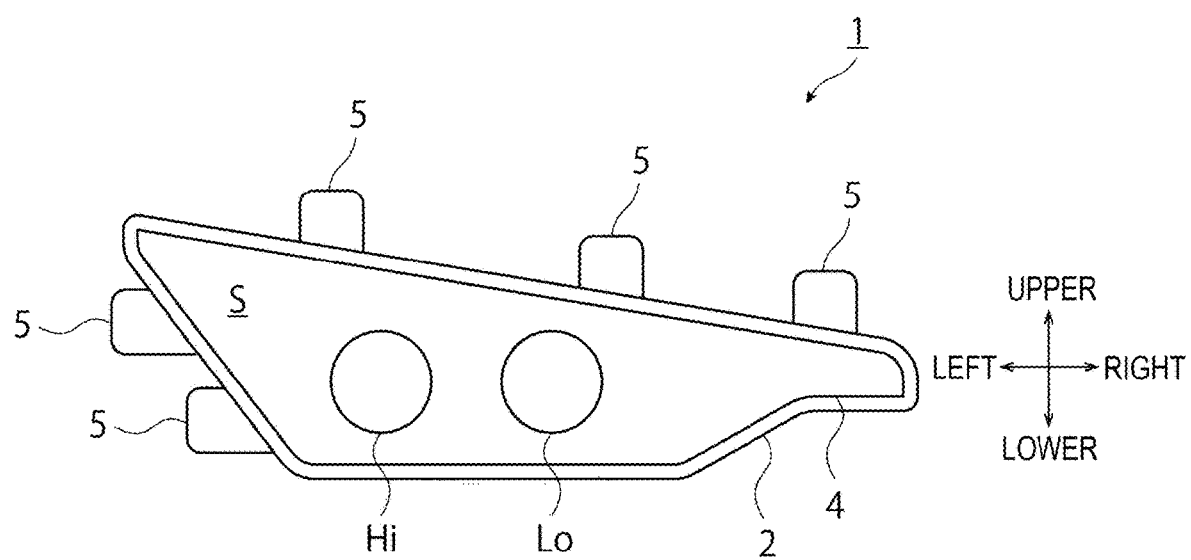
FIG. 1 is a front view showing a schematic configuration of a vehicle lamp according to an embodiment.

FIG. 1 is a front view of a vehicle lamp 1 according to a preferred embodiment of the present invention. The vehicle lamp 1 is a headlamp that is mounted on the left and right corner portions of the front of a vehicle.

As shown in FIG. 1, the vehicle lamp 1 includes a container-shaped lamp body 2 having an open front side, and a front cover 4 assembled to the front opening of the lamp body 2. The front cover 4 is made of a translucent resin such as polycarbonate or glass, and the front cover 4 is attached to the opening of the lamp body 2, so that a lamp chamber S is implemented by the lamp body 2 and the front cover 4.

A high beam lamp unit Hi and a low beam lamp unit Lo are accommodated in the defined lamp chamber S.

The high beam lamp unit Hi and the low beam lamp unit Lo are optical units that irradiate the front of the vehicle with light emitted from a light source to form a high beam light distribution or a low beam light distribution. The lamp units (Hi and Lo) have a known configuration in the related art, such as a reflective type or a projector type lamp unit, and the type thereof does not matter.

Lamp Body 2

Figure 2:
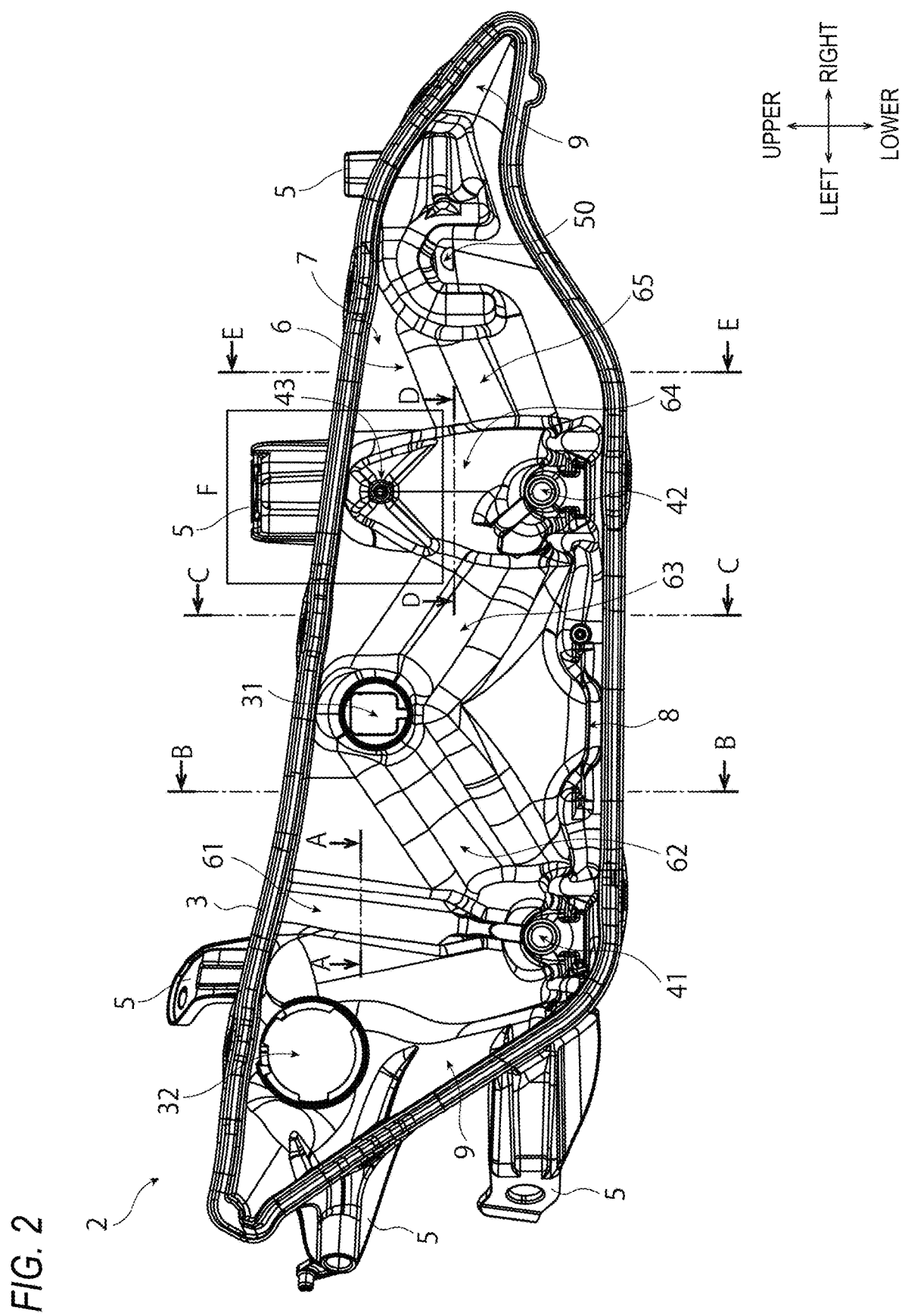
FIG. 2 is a front view of a lamp body.
Figure 3:
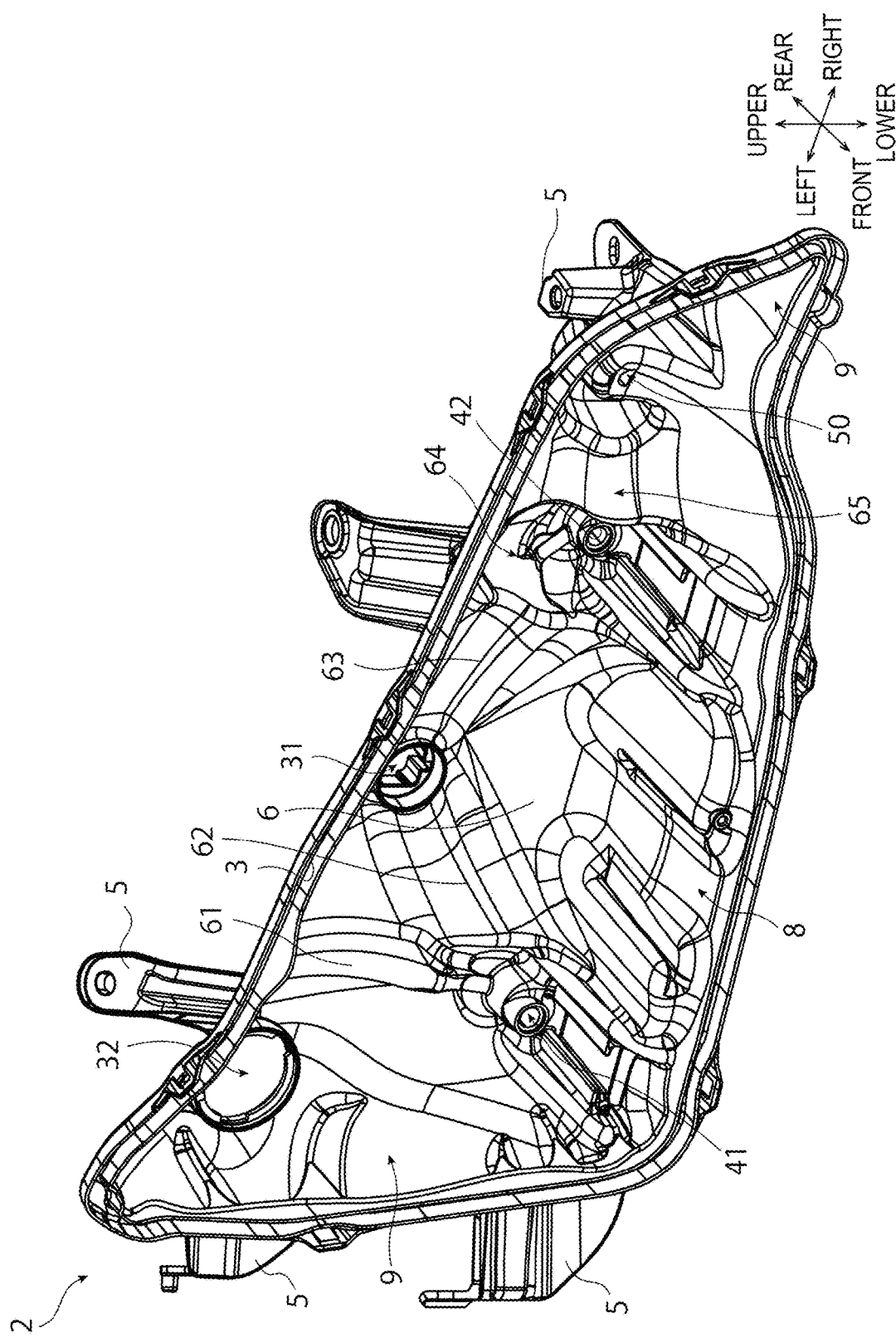
FIG. 3 is a perspective view of the lamp body.

The shape of the lamp body 2 will be described in detail. FIG. 2 is a front view of the lamp body 2. FIG. 3 is a front perspective view of the lamp body 2.

The lamp body 2 is molded by injection molding using a hard synthetic resin material. A seal groove 3 for engaging with a seal leg provided on the periphery of the front cover 4 is provided around the periphery of the front opening of the lamp body 2. A vehicle body attachment portion 5 for attachment to the vehicle body is provided on the outer surface of the peripheral portion of the front opening of the lamp body 2 in a manner of corresponding to the shape of the attachment portion on the vehicle body side. The vehicle body attachment portions 5 are provided at five locations on the outer surface of the lamp body 2, three locations on the upper side and two locations on the left side.

The lamp body 2 includes a back wall 6, a ceiling surface 7, a bottom surface 8, and left and right side surfaces 9 as constituent surfaces. The back wall 6 bulges toward the back side of the lamp body 2 and is connected to the adjacent ceiling surface 7, bottom surface 8, and side surface 9 via the ridge lines. The ceiling surface 7, the bottom surface 8, and the side surface 9 have a convex curved shape that gently bulges toward the outside of the lamp body 2, are gently curved at the edge portions thereof, and are continuously coupled without any bent portions or steps. Therefore, the lamp body 2 is formed in a rounded container shape as a whole. In the present embodiment, the ceiling surface 7 extends from the opening of the lamp body 2 toward the back surface, but the amount of extension thereof is small. The ceiling surface 7 extends from the edge portion of the opening while gently curving downward from the back surface, is connected to the back wall 6, and is integrally formed with the back wall 6. In this way, the constituent surface of the lamp body 2 is mainly implemented by a curved surface having a large radius of curvature rather than a flat surface.

In the lamp body 2, a first unit attachment hole 31 for attaching the low beam lamp unit Lo is formed above the center of the back wall 6. A second unit attachment hole 32 for attaching the high beam lamp unit Hi is formed above the left side of the back wall 6.

In addition, a first aiming member attachment hole 41, a second aiming member attachment hole 42, and a third aiming member attachment hole 43 are formed around the first unit attachment hole 31 in the lamp body 2. An aiming member (not shown) is attached to the aiming member attachment holes 41, 42, and 43.

The first aiming member attachment hole 41 is formed between the first unit attachment hole 31 and the second unit attachment hole 32 in the left-right direction, and is formed at the lower edge portion of the back wall 6 in the upper-lower direction. The second aiming member attachment hole 42 is formed at a position that is substantially symmetrical with respect to the first aiming member attachment hole 41 in the left-right direction with the first unit attachment hole 31 as a reference. Therefore, the second aiming member attachment hole 42 is formed at the lower edge portion of the back wall 6, which is offset from the first unit attachment hole 31 to the right in the opposite direction to the first aiming member attachment hole 41, by substantially the same distance as the distance from the first unit attachment hole 31 to the first aiming member attachment hole 41. The third aiming member attachment hole 43 is formed above the second aiming member attachment hole 42 and at the upper end portion of the back wall 6.

Further, in the lamp body 2, a breathing hole 50 is formed in a region to the right of the third aiming member attachment hole 43 and closest to the right of the back wall 6. The breathing hole 50 allows the air in the lamp chamber S to expand and contract due to heat generation due to lighting of the light sources of the lamp units Hi and Lo and changes in temperature. Moisture in the lamp chamber S is released to the outside, and moisture accumulation in the lamp chamber S is prevented. Accordingly, fogging in the lamp chamber S caused by moisture in the lamp chamber S adhering to the front cover 4 from the inside of the lamp chamber S is prevented.

Back Wall and Beam

A first beam 61, a second beam 62, a third beam 63, a fourth beam 64, and a fifth beam 65 constituting a part of the back wall 6 extend from the upper end portion of the back wall 6 to the lower end portion of the back wall 6. Hereinafter, a part of the back wall 6 other than the part constituted by the beams 61 to 65 is referred to as a back wall main body 69.

The first beam 61 extends straight from the first aiming member attachment hole 41 formed at the lower end portion of the back wall 6 to the upper end portion of the back wall 6 generally upward in the front view.

The second beam 62 extends from the first aiming member attachment hole 41 on the lower side to the second unit attachment hole 32 on the upper side in a manner of connecting the first aiming member attachment hole 41 and the second unit attachment hole 32 as end points. Therefore, the second beam 62 is inclined to the right in the front view.

The third beam 63 extends from the second aiming member attachment hole 42 on the lower side to the first unit attachment hole 31 on the upper side in a manner of connecting the second aiming member attachment hole 42 and the first unit attachment hole 31 as end points. Therefore, the third beam 63 is inclined to the left in the opposite direction to the second beam 62 in the front view.

The fourth beam 64 extends from the second aiming member attachment hole 42 on the lower side to the third aiming member attachment hole 43 on the upper side in a manner of connecting the second aiming member attachment hole 42 and the third aiming member attachment hole 43 as end points. Therefore, the fourth beam 64 is formed substantially vertically in the front view.

The fifth beam 65 extends from the second aiming member attachment hole 42 on the lower side to the breathing hole 50 on the upper side in a manner of connecting the second aiming member attachment hole 42 and the breathing hole 50 as starting points. Therefore, the fifth beam is inclined to the right in the front view.

Figure 4A:
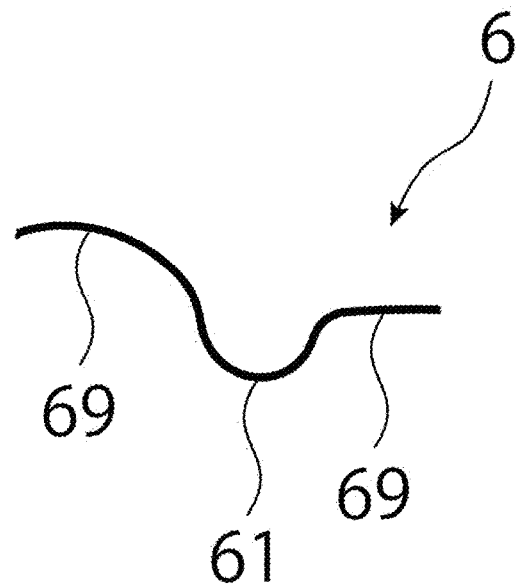
FIG. 4A is an end view of the lamp body. This view is along an instruction line (a cut surface) shown in FIG. 2.
Figure 4B:
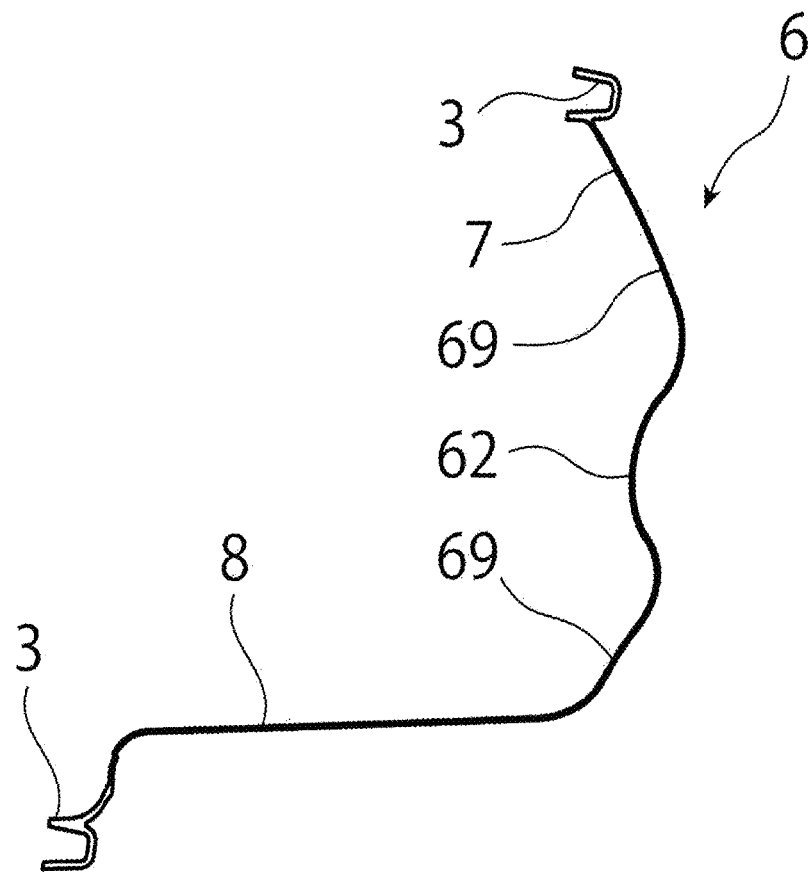
FIG. 4B is an end view of the lamp body. This view is along an instruction line (a cut surface) shown in FIG. 2.
Figure 4C:
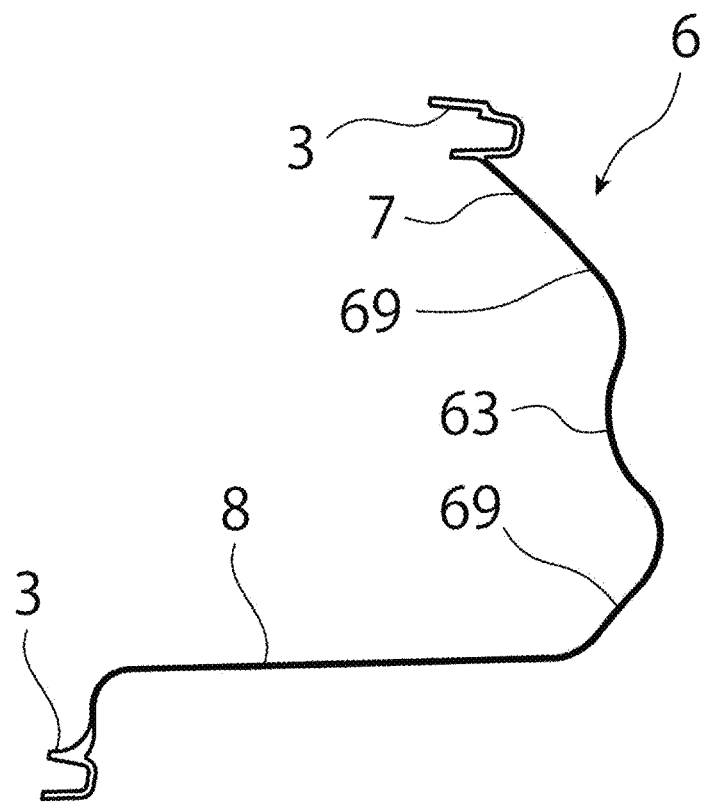
FIG. 4C is an end view of the lamp body. This view is along an instruction line (a cut surface) shown in FIG. 2.
Figure 4D:
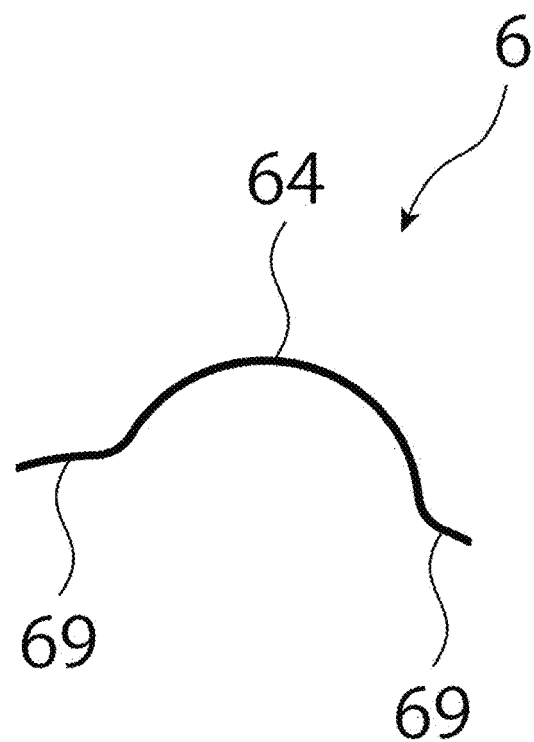
FIG. 4D is an end view of the lamp body. This view is along an instruction line (a cut surface) shown in FIG. 2.
Figure 4E:
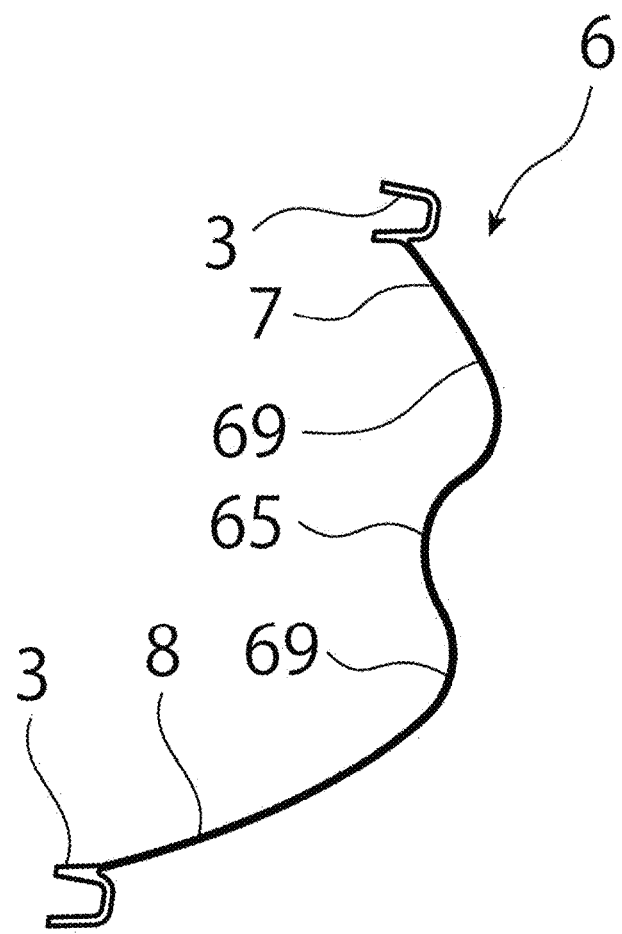
FIG. 4E is an end view of the lamp body. This view is along an instruction line (a cut surface) shown in FIG. 2.

FIGS. 4A to 4E are end views taken along a cutting line shown in FIG. 2. FIG. 4A is an end view taken along a line A-A in FIG. 2, and mainly shows the cross-sectional shape of the first beam 61. FIG. 4B is an end view taken along a line B-B in FIG. 2, and mainly shows the cross-sectional shape of the second beam 62. FIG. 4C is an end view taken along a line C-C in FIG. 2, and mainly shows the cross-sectional shape of the third beam 63. FIG. 4D is an end view taken along a line D-D in FIG. 2, and mainly shows the cross-sectional shape of the fourth beam 64. FIG. 4E is an end view taken along a line E-E in FIG. 2, and mainly shows the cross-sectional shape of the fifth beam 65.

As shown in FIGS. 4A to 4E, the cross-sectional shapes of the beams 61 to 65 perpendicular to the extending direction thereof are all a substantially arc shape, although differ in radius of curvature, width, and amount of protrusion. The first beam 61, the second beam 62, the third beam 63, and the fifth beam 65 are formed such that the protruding direction of the curved surface thereof is the lamp chamber S direction (forward). The fourth beam 64 is formed such that the curved surface and protruding direction thereof are directed toward the outside of the lamp chamber S (the back surface direction).

The beams 61 to 65 are smoothly connected to the back wall main body 69 via the ridge lines regardless of the protruding direction. The cross-sectional shape of the lamp body 2 is constructed continuously without any bent portions while maintaining a constant wall thickness.

For example, the longitudinal cross-sectional shape of the back wall 6 including the second beam 62 will be described in detail with reference to FIG. 4B. As shown in FIG. 4B, the seal groove 3 is formed at the upper edge portion of the opening of the lamp body 2 (see also FIG. 2), from which the back wall main body 69 integrated with the ceiling surface 7 extends downward from the back surface, curves forward at the boundary portion with the second beam 62, and is smoothly connected with the second beam 62. The second beam 62 extends downward, curves forward, and then curves toward the back surface again to form a substantially arc shape that bulges forward. The second beam 62 curves forward and downward at the lower edge portion, and is smoothly connected to the back wall main body 69 again. The back wall main body 69 extends forward and downward, curves toward the inside of the lamp chamber S, and is connected to the edge portion of the bottom surface 8 curved with the same curvature. The bottom surface 8 extends forward as it is, and is connected to the seal groove 3 formed at the lower edge portion of the opening of the lamp body 2. In this way, the ceiling surface 7 and the back wall main body 69, the back wall main body 69 and the second beam 62, and the back wall main body 69 and the bottom surface 8 curve and are smoothly connected with the same curvature so as not to form a bent portion or a step at the connection portions thereof.

As shown in FIGS. 4A, 4C, 4D, and 4E, the first beam 61, the third beam 63, the fourth beam 64 (the convex direction of the beam portion is the opposite direction), and the fifth beam 65 are similarly connected with the back wall main body 69 via the ridge lines. In this way, the beams 61 to 65 extend from the upper end portion to the lower end portion of the back wall 6 while maintaining the cross-sectional shape in the extending direction thereof in a substantially arc shape, and is continuously and smoothly connected with the back wall main body 69 at the end portions of the adjacent surfaces without forming a step or a corner portion.

The cross-sectional shape of the lamp body 2 implemented as described above is a wavy shape in which complicated curves are continuous. Further, the back wall 6 is similarly connected with the ceiling surface 7, the bottom surface 8, and the side surfaces 9 and 9 via the ridge lines, and at the boundary portion, both curve to the same curvature and are connected smoothly and continuously. The back wall 6, the ceiling surface 7, the bottom surface 8, and the side surfaces 9 themselves are generally curved surfaces having a large radius of curvature and gently bulging outward, and adjacent curved surfaces are smoothly continuous. Therefore, the lamp body 2 itself is mainly implemented by a curved surface, the formation of the corner portion is reduced, and the wall thickness is kept substantially constant.

Advantageous Effects

Figure 5:
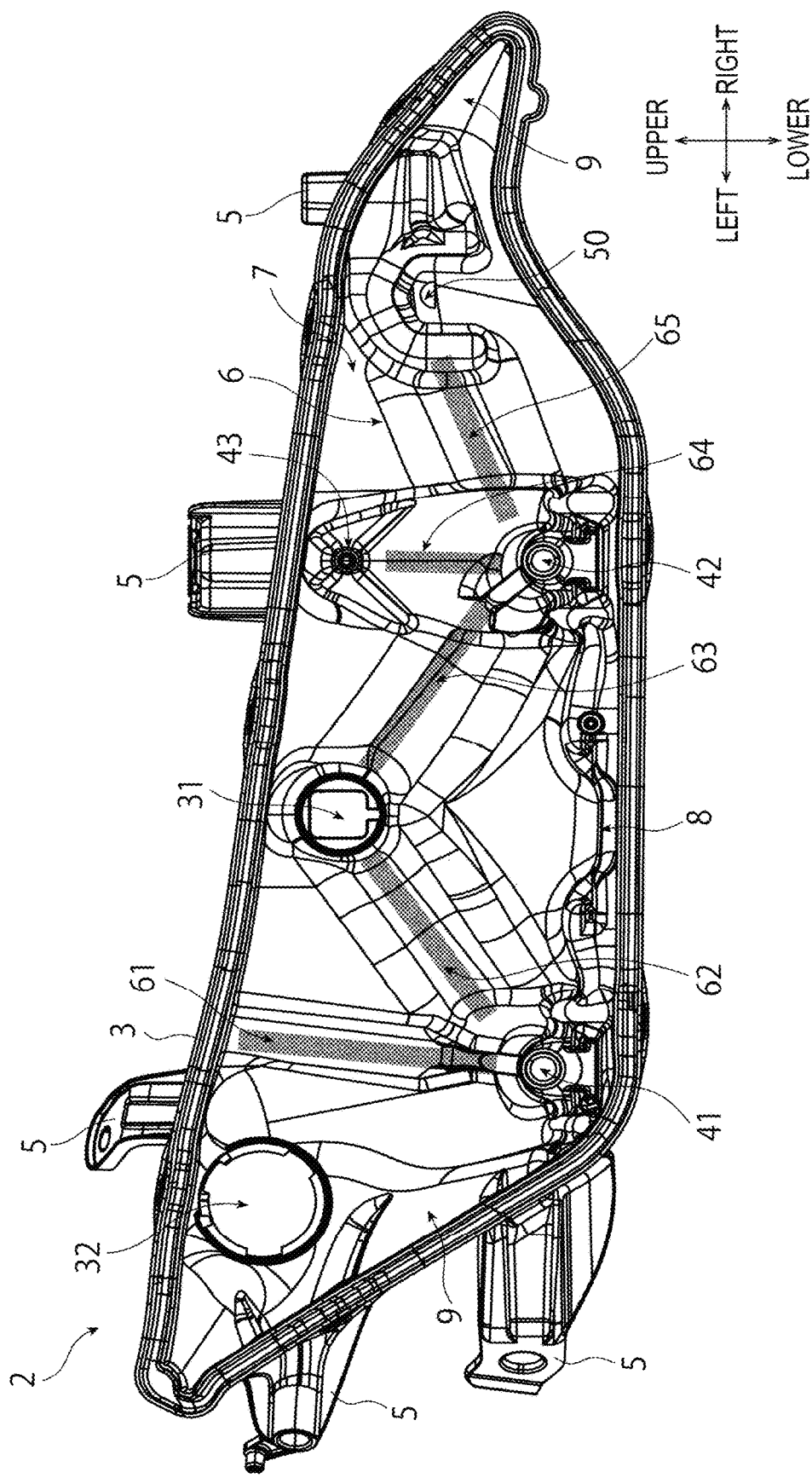
FIG. 5 is an explanatory view showing a truss structure using a beam. This view corresponds to FIG. 2.

The advantageous effects of the back wall 6 and the lamp body 2 implemented as described above will be described with reference to FIGS. 5 to 6B. FIG. 5 is a front view of the lamp body 2, and shows the beams 61 to 65 of the lamp body 2 in light black.

As shown in FIG. 5, the beams 61 to 65 have a truss structure in triangular units. In the truss structure, the beams 61 to 65 extend from the upper end portion to the lower end portion of the back wall 6 and in which one beam extends obliquely from the end portion of another beam. Therefore, the lamp body 2 including the back wall 6 has a structure that is less likely to deform under a load. Since the beams 61 to 65 themselves have curved surfaces having a substantially arc-shaped cross section to disperse stress, the beams 61 to 65 have a highly rigid structure that is more resistant to deformation. Accordingly, the rigidity of the lamp body 2 is improved, and due to the improved rigidity, the lamp body 2 can be made thinner, and the lamp body 2 can be made lighter.

In the present embodiment, the first unit attachment hole 31 and the aiming member attachment holes 41, 42, and 43 formed in the back wall 6 are formed at the end portions of the beams 61 to 65. This is because the attachment holes are thicker and more rigid than other parts of the back wall 6 due to the nature of attaching other components thereto. Therefore, by providing these structurally necessary components in a part of the beam, particularly at the important joint point of the beam, the rigidity of the back wall 6 and the lamp body 2 is improved. Since the breathing hole 50 is provided with a waterproof wall that surrounds the breathing hole 50, the breathing hole 50 is a highly rigid part similar to the attachment hole.

A part of the seal groove 3 at the opening also constitutes a part of the truss structure. Similarly to the attachment hole, the seal groove 3 at the opening is thicker and more rigid than other parts due to the nature of engagement with other components (see FIGS. 4A to 4E). The rigidity of the lamp body 2 is improved using at least a part of the seal groove 3 and forming the truss structure together with the beams 61 to 65.

Figure 6B:
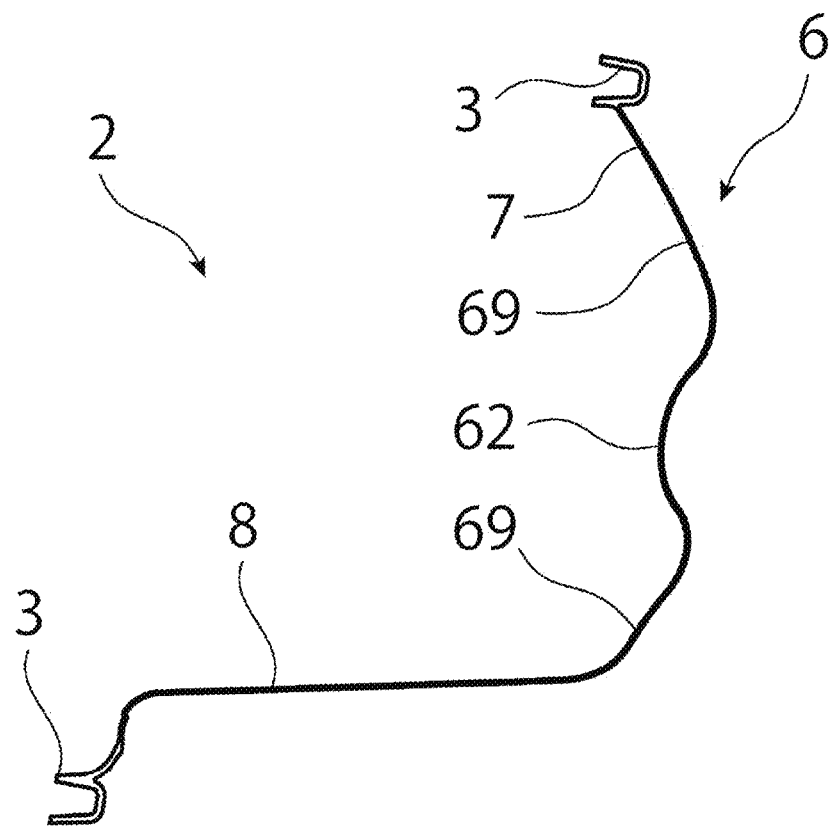
FIG. 6B is a vertical end view of a lamp body 2.
Figure 6B:
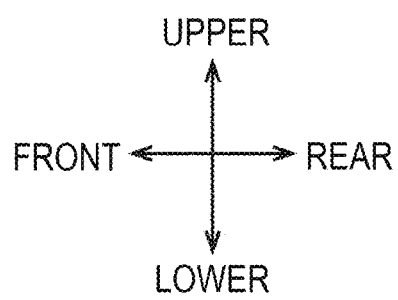

Next, the advantageous effects of the shape of the lamp body 2 will be described. FIG. 6A is a vertical cross-sectional view showing a schematic diagram of a lamp body 102 having a configuration in the related art for comparison. FIG. 6B is a vertical cross-sectional view of the lamp body 2.

As shown in FIG. 6A, the lamp body 102 having a configuration in the related art includes a generally planar back wall 106, a ceiling surface 107, and a bottom surface 108, and the ceiling surface 107 and the bottom surface 108 which are horizontal surfaces are connected to the upper and lower end portions of the vertically provided back wall 106. Therefore, a corner portion bent at 90 degrees is formed at the connection portion. In this way, stress tends to concentrate at the corner portion formed by the flat surface and the flat surface. Therefore, in the configuration in the related art, in order to ensure the rigidity of the corner portion and prevent deformation due to concentration of stress, a rib 110 is provided at the corner portion.

On the other hand, as shown in FIG. 6B, in the lamp body 2, the back wall 6, the ceiling surface 7, and the bottom surface 8 are connected to each other via the ridge lines. In this way, the lamp body 2 is mainly implemented by a curved surface, and the adjacent surfaces are curved and connected at the same curvature at the boundary. The constituent surfaces are smoothly continuous in this manner, so that no portion is formed where stress tends to concentrate as in the configuration in the related art. That is, according to the configuration described above, since the stress applied to the lamp body 2 is dispersed, the lamp body 2 has a highly rigid structure that is resistant to deformation.

In the present embodiment, although all the constituent surfaces are connected to each other by the ridge line, it is sufficient that at least the back wall 6 is connected to any one of the ceiling surface 7, the bottom surface 8, and the side surface 9 via the ridge line.

Similarly, the beams 61 to 65 are connected to the back wall main body 69 via the ridge line, and are smoothly continuous with each other even at the connection portion. Therefore, the cross-sectional shape of the back wall 6 is curved, stress concentration on the corner portion is prevented, and the rigidity is improved. In this case, the direction in which the beams 61 to 65 curve with respect to the extending direction (the direction in which the substantially arc-shaped cross section protrudes) may be either forward or backward (the back surface direction).

According to the above configuration, since the wall thickness can be kept approximately constant even at the connection portion with a surface that tends to be thick, the weight can be reduced. In addition, the connection point of the reinforcing member such as the rib and the corner portion are thick and tend to trap heat, and thus are portions at which the molding defect is likely to occur during resin molding. Since the above configuration can prevent heat trapping, the molding defect can also be prevented.

Boss Shape

Figure 7A:
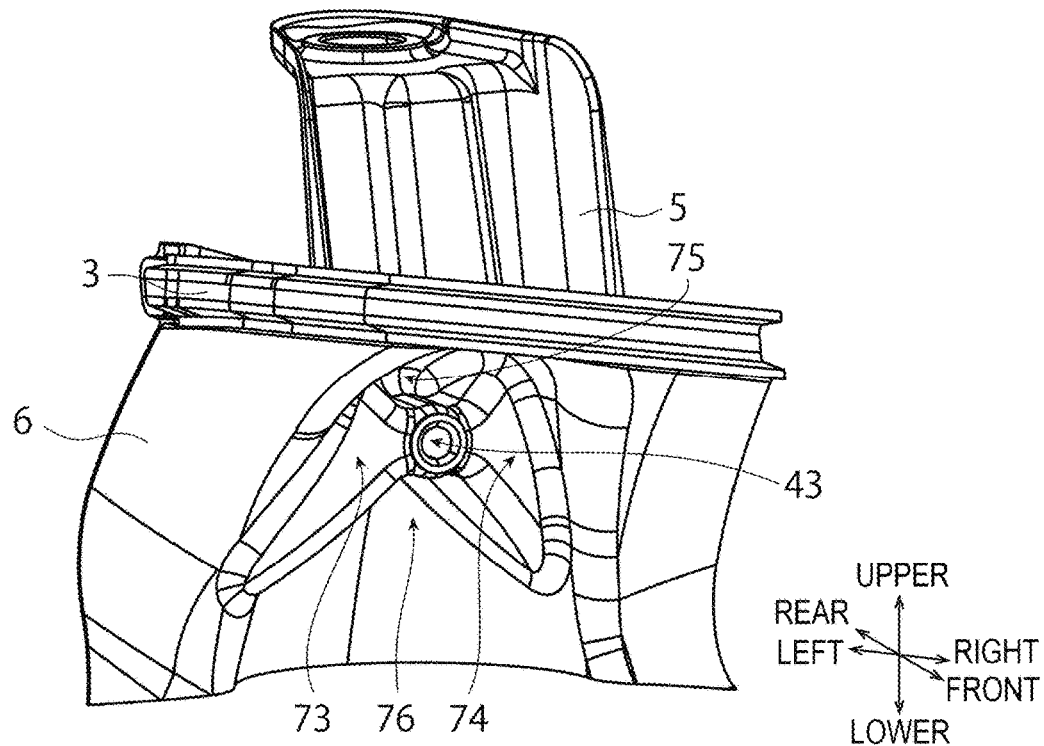
FIG. 7A is an enlarged front perspective view of a part F in FIG. 2.
Figure 7B:
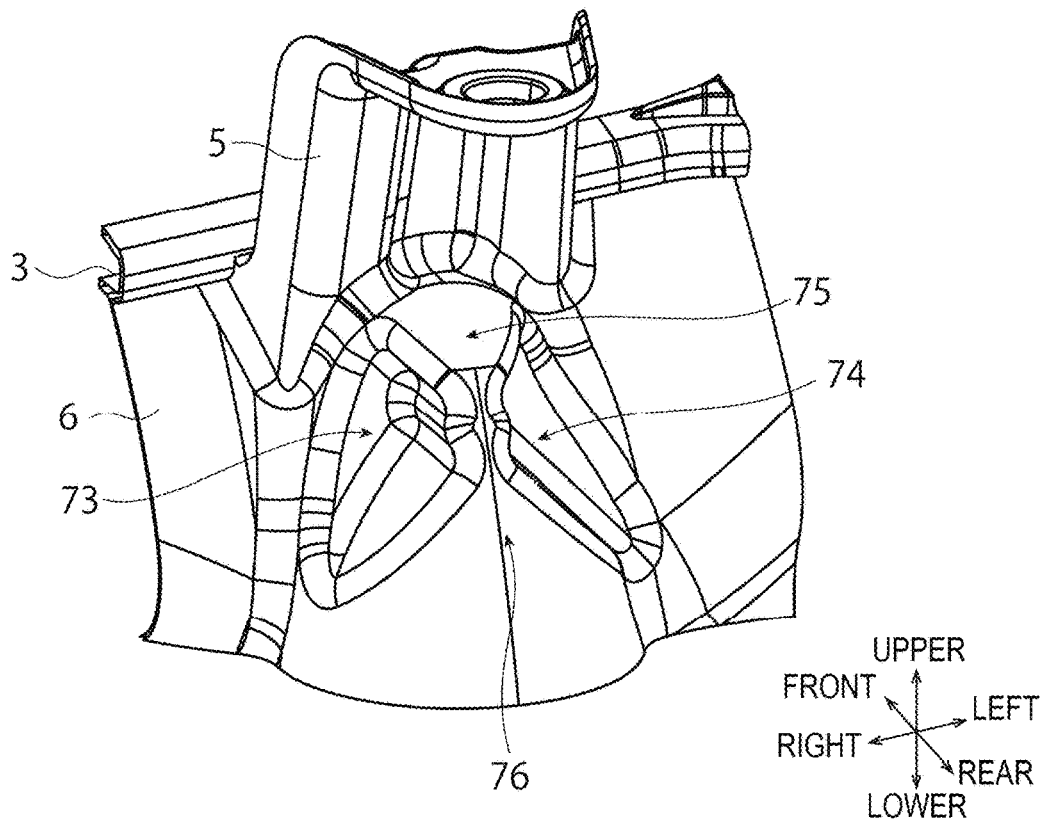
FIG. 7B is a back perspective view of the part F in FIG. 2.
Figure 8A:
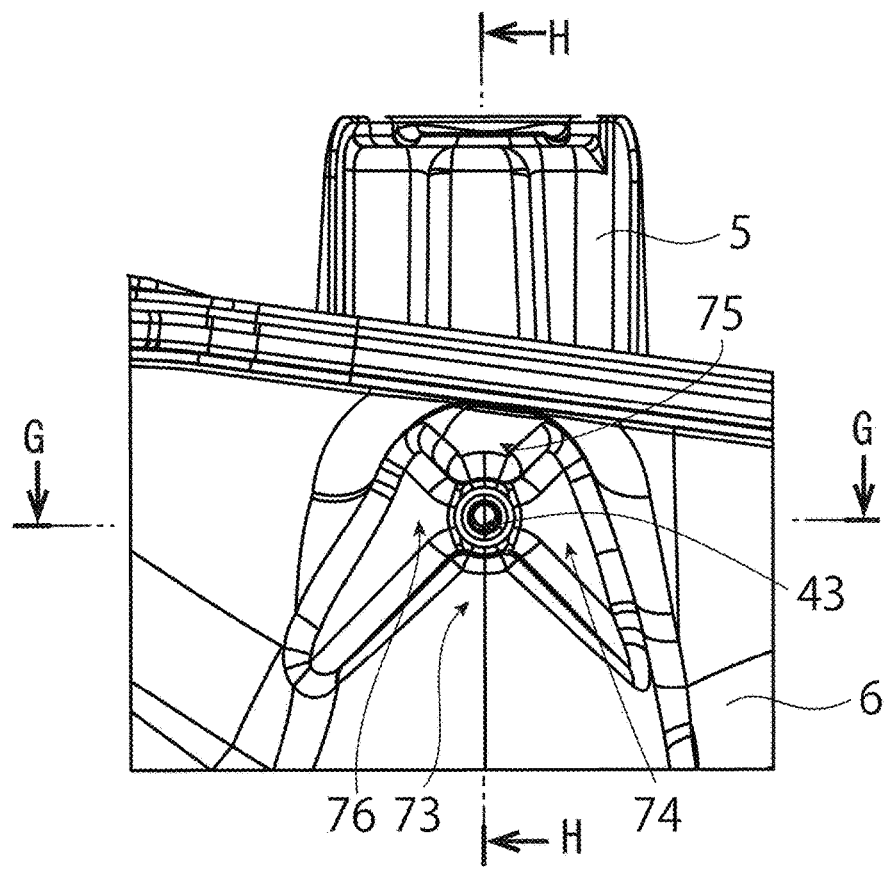
FIG. 8A is an enlarged front view of the part F in FIG. 2.
Figure 8B:
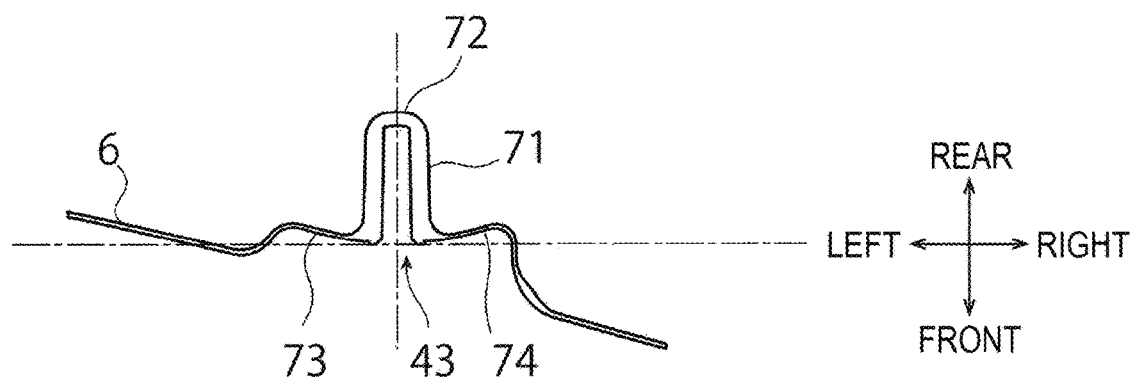
FIG. 8B is a horizontal end view taken along a line G-G in FIG. 8A.
Figure 8C:
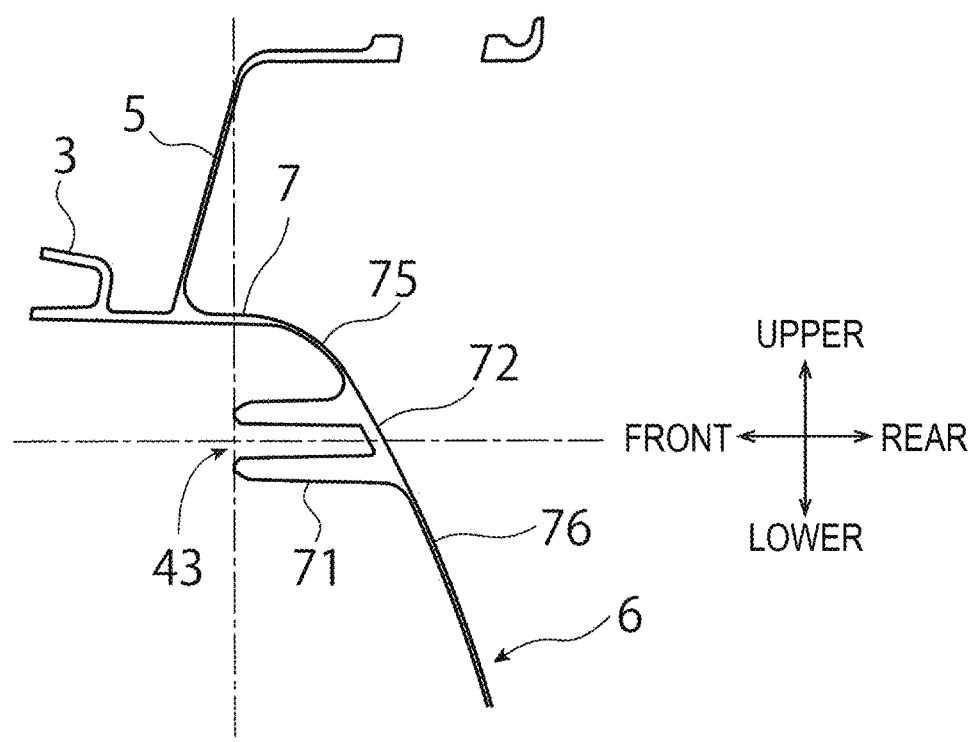
FIG. 8C is an end view taken along a line H-H in FIG. 8A.

The lamp body 2 is mainly implemented as a continuous curved surface in a manner of not providing a bent portion, and the same applies to a hole, a boss, and the like formed in the back wall 6. The above configuration will be described with reference to FIGS. 7A to 8B. FIGS. 7A to 8B show a part F in FIG. 2, and mainly show the third aiming member attachment hole 43. FIG. 7A is a front perspective view, and FIG. 7B is a back perspective view. FIG. 8A is a front view of the part F. FIG. 8B is an end view taken along a line G-G shown in FIG. 8A. FIG. 8C is an end view taken along a line H-H shown in FIG. 8A.

As shown in FIGS. 7 to 8B, the third aiming member attachment hole 43 is formed by a cylindrical boss peripheral wall 71 and a boss bottom surface 72, and protrudes forward from the back wall 6. The third aiming member attachment hole 43 is a hole into which the shaft of the pivot member is inserted, and is formed in the shape of a boss having a bottom surface rather than a through hole.

The boss peripheral wall 71 protrudes from the back wall 6. Similarly to the beam structure described above, the boss peripheral wall 71 constitutes a part of the back wall 6 and is connected to the back wall 6 via the ridge line. Further, in order to reduce the wall thickness portion, at least a part of the boss peripheral wall 71 extends from the opening at the distal end toward the base end portion and is connected to the back wall 6.

This structure will be described in detail with reference to the drawings. In the back wall 6 around the boss peripheral wall 71, an upper region 75 and a lower region 76 of the boss peripheral wall 71 are formed in a concave shape recessed toward the back surface in the front view, and relatively, a left region 73 and a right region 74 of the boss peripheral wall 71 are formed in a convex shape (see FIG. 7A). The boss peripheral wall 71 is formed thick since the boss peripheral wall 71 is engaged with other components, and the wall thickness of the back wall 6 is kept generally constant. That is, when the boss peripheral wall 71 is viewed from the back, the upper region 75 and the lower region 76 are formed in the convex shape, and the left region 73 and the right region 74 are formed in the concave shape (see FIG. 7B). Accordingly, in the upper and lower regions of the boss peripheral wall 71, the boss peripheral wall 71 protrudes from the back wall 6 (see FIG. 8C), and in the left and right regions, the boss peripheral wall 71 is recessed in the back wall 6 (see FIG. 8B).

The boss peripheral wall 71 extends gently toward the back surface at the edge portion in the region of the distal end opening in the left-right direction, is connected to the back wall 6, and constitutes a part of the back wall 6. The boss bottom surface 72 is continuous with the back wall main body 69 without a step at the edge portion of the boss bottom surface 72 in the upper-lower direction, and has a structure that is integrated with the back wall main body 69. Since a part of the distal end portion of the protruding portion (the boss peripheral wall 71) and a part of the base end portion of the protruding portion are directly connected to the back wall 6, the rigidity is high. In the related art, it was necessary to provide a rib on the landing portion (the base end portion) of the protruding portion in order to improve the rigidity, and the rib connection portion was thick. However, in the present embodiment, with the above structure, the boss shape can be reinforced without creating a thick wall portion using a so-called thinning configuration.

In the configuration of the present disclosure, the beam is provided on the back wall. Alternatively, the beam may be provided on the ceiling surface, the bottom surface, and the side surface as well. The extending direction and the form of the beams 61 to 65 are merely examples, and another type of truss form may be used as long as a triangular-based truss structure is formed. The joint portions of the beams 61 to 65 are not limited to the attachment holes, and a portion having high rigidity such as a protruding portion, an attachment portion, or a breathing hole may be used. A structure may be used in which an attachment hole or a protruding portion is provided in the middle of each of the beams 61 to 65.

Although the preferred embodiment of the present invention has been described above, the above embodiment is an example of the present invention. It is possible to combine these embodiments based on the knowledge of those skilled in the art, and such forms are also included within the scope of the present invention.

The invention claimed is:

1. A vehicle lamp comprising:
   a container-shaped lamp body whose front surface is opened; and
   a front cover assembled to a front opening of the lamp body and defines a lamp chamber inside,
   wherein, on a back wall of the lamp body, a plurality of beams having a substantially arc-shaped cross section and constituting a part of the back wall extend in a truss shape from an upper edge portion to a lower edge portion of the back wall.

2. The vehicle lamp according to claim 1,
   wherein the back wall of the lamp body is connected to at least one of a ceiling surface, a bottom surface, and left and right side surfaces of the lamp body via a ridge line.

3. The vehicle lamp according to claim 1,
   wherein a seal groove for engagement with a seal leg of the front cover is formed around a periphery of the front opening of the lamp body, and at least a part of the seal groove constitutes a truss structure together with the plurality of beams formed on the lamp body.

4. The vehicle lamp according to claim 1,
wherein a plurality of component attachment holes are formed in the back wall of the lamp body, and one of the holes is formed at an end portion of the beam.

5. The vehicle lamp according to claim 1,
wherein, in a protruding portion provided on the back wall, at least a part of a protruding end portion of the protruding portion extends toward a base end portion of the protruding portion and constitutes a part of the back wall.

\* \* \* \* \*